(12) United States Patent
Kirkpatrick

(10) Patent No.: US 11,268,197 B2
(45) Date of Patent: Mar. 8, 2022

(54) SYSTEM AND METHOD FOR PRODUCING HYDROGEN AND OXYGEN GAS

(71) Applicant: Michael Kirkpatrick, Jacksonville, TX (US)

(72) Inventor: Michael Kirkpatrick, Jacksonville, TX (US)

( * ) Notice: Subject to any disclaimer, the term of this patent is extended or adjusted under 35 U.S.C. 154(b) by 1377 days.

(21) Appl. No.: 14/788,693

(22) Filed: Jun. 30, 2015

(65) Prior Publication Data

US 2015/0299872 A1  Oct. 22, 2015

Related U.S. Application Data

(63) Continuation-in-part of application No. 13/787,662, filed on Mar. 6, 2013, now abandoned.

(60) Provisional application No. 61/773,686, filed on Mar. 6, 2013, provisional application No. 62/055,165, filed on Sep. 25, 2014.

(51) Int. Cl.

| | |
|---|---|
| *C25B 9/00* | (2021.01) |
| *C25B 1/04* | (2021.01) |
| *C25B 15/08* | (2006.01) |
| *C25B 11/00* | (2021.01) |
| *C25B 9/17* | (2021.01) |
| *C25B 9/63* | (2021.01) |
| *C25B 9/65* | (2021.01) |
| *C25B 9/73* | (2021.01) |

(52) U.S. Cl.
CPC ............... *C25B 1/04* (2013.01); *C25B 9/17* (2021.01); *C25B 9/63* (2021.01); *C25B 9/65* (2021.01); *C25B 9/73* (2021.01); *C25B 11/00* (2013.01); *C25B 15/08* (2013.01); *Y02E 60/36* (2013.01)

(58) Field of Classification Search
CPC .... C25B 1/04; C25B 9/00; C25B 1/00; C25B 9/08; C25B 1/02; C25B 9/04; C25B 9/16
USPC .......................... 204/278, 242; 205/628, 615
See application file for complete search history.

(56) References Cited

U.S. PATENT DOCUMENTS

| | | | | |
|---|---|---|---|---|
| 3,374,158 | A * | 3/1968 | Lord ......................... | C25B 1/12 204/270 |
| 6,890,410 | B2 * | 5/2005 | Sullivan .................... | C25B 1/04 204/258 |
| 2005/0011765 | A1 * | 1/2005 | Omasa ...................... | C25B 1/04 204/633 |

* cited by examiner

*Primary Examiner* — Zulmariam Mendez
(74) *Attorney, Agent, or Firm* — Braxton Perrone, PLLC; Bobby W. Braxton; Gregory Perrone

(57) ABSTRACT

A method and system for electrolysis. The system includes a system and method for separately collecting hydrogen and oxygen gases produced by a plurality of anode and cathode plates, one of the anode or cathode plates surrounded by an envelope penetrable by an electrolyte solution and impervious to hydrogen and oxygen gas. The system includes an electrolytic cell which has a front end and a back end. The front end has a cathode electrode coupled to a cathode screw, and an anode electrode coupled to an anode screw. The screws are coupled to a spacer, which is coupled to an insert. Each insert is further coupled to a second insert. The coupling results in the plate being conductive. The plates each have at least two holes, a large hole and a small hole. The small hole makes contact with a spacer and/or an insert.

9 Claims, 8 Drawing Sheets

SYSTEM AND METHOD FOR PRODUCING HYDROGEN AND OXYGEN GAS

CROSS REFERENCE TO RELATED APPLICATIONS

This application is a continuation-in-part of U.S. Non-Provisional patent application Ser. No. 13/787,662 entitled "Method and System for Electrolysis," filed Mar. 6, 2013 and U.S. Provisional Patent Application No. 61/773,686 entitled "Method and System for Electrolysis," filed Mar. 6, 2013, the entirety of which is incorporated herein by reference and U.S. Provisional Patent Application No. 62/055,165 filed Sep. 25, 2014, the entirety of which is incorporated herein by reference.

BACKGROUND OF THE INVENTION

Technical Field

The present invention relates to a system and apparatus for electrolysis.

Description of Related Art

Carbon based fuels, such as so-called fossil fuels, are in high demand. However, the supply is finite. As such, industry is seeking for ways to maximize or increase the efficiency of these fossil fuels. Consequently, it is desirable to have a method to produce a fuel which does not originate from fossil fuels.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

In one embodiment, electrolysis is utilized to produce a hydrogen based fuel. A hydrogen based fuel, as used herein, refers to a fuel whose primary element is hydrogen. The fuel produced can vary depending upon the materials utilized. For example, the hydrogen based fuel produced can comprise hydrogen gas, ortho-hydrogen, para-hydrogen, and combinations thereof.

The hydrogen based fuel can be fed to an engine for power or collected and stored. In one embodiment the hydrogen based fuel produced is provided as the primary source of fuel. In other embodiments, however, the fuel produced is used to supplement a primary fuel source. For example, an engine's primary fuel source may comprise gasoline or diesel, but the engine can be supplemented with hydrogen based fuel. The supplemental fuel can result in increased power, increased efficiency, for example in terms of miles per gallon of fuel, and combinations thereof.

Figure 1:
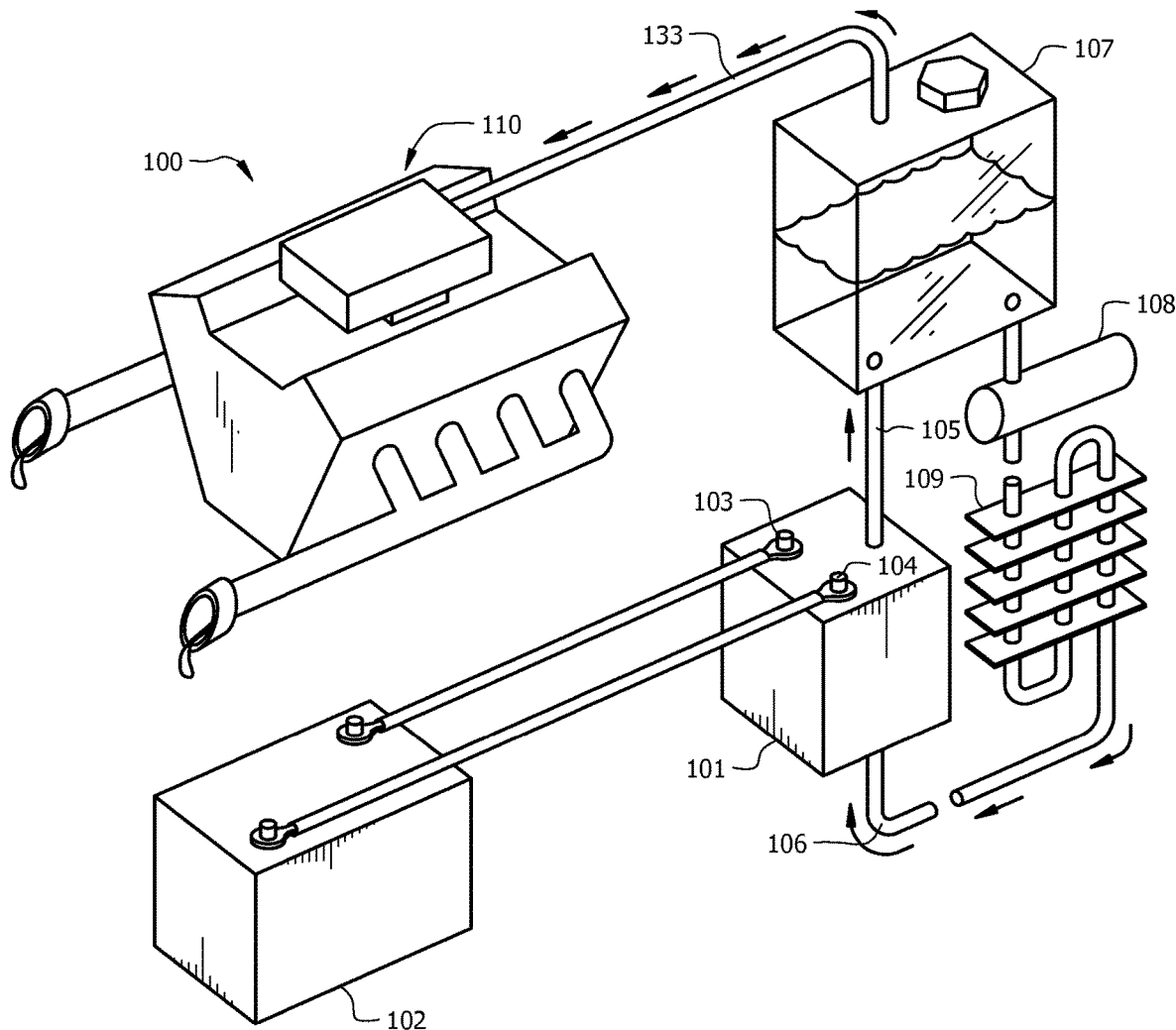
FIG. 1 is a depiction of a system in one embodiment.

FIG. 1 is a depiction of a system in one embodiment. As depicted the system 100 comprises a reservoir 107 coupled to an engine 110. As noted above, the engine can comprise a diesel engine, gasoline engine, natural gas engine, and virtually any type of engine which burns carbon based fuels.

The reservoir 107 comprises a level of liquid. In one embodiment the liquid comprises water and electrolytes. In one embodiment the water comprises distilled water. An electrolyte is a substance containing free ions which are the carriers of electric current. Pure distilled water is not electrically conductive, and thus impurities or other solids are needed to make water electrically conductive. Electrolytes within the water make water electrically conductive.

Virtually any type of electrolyte can be utilized. Possible electrolytes include, but are not limited to, potassium hydroxide, sodium hydroxide, acids, bases, and salts. During hydrolysis, the bond between the oxygen and hydrogen in the water molecule is broken with electrical energy, releasing hydrogen gas, oxygen gas, hydrogen based fuels, and combinations thereof. Thus, the amount of water in the system decreases over time as the water is converted into a gas. However, the electrolytes, provided there are no leaks in the system, do not otherwise leave the system. Accordingly, electrolytes, once added to the reservoir, do not require frequent replacement. In one embodiment, the fluid comprising electrolytes is acidic.

The concentration of the electrolytes within the fluid can vary. In one embodiment, the amount of electrolytes is related to the amps being drawn by the electrolytic cell from the power source. In one embodiment with a small engine and a limited alternator, the unit draws about 35 amps. In other embodiments utilizing an oil field generator or a ship engine, as an example, the amps can be as high as between 85 and about 105 amps. In such embodiments, there is virtually unlimited available power coming from an on-site megawatt generator. The electrolyte concentration, the pH, and the temperature of the fluid all have an effect on electrolysis. Consequently, in one embodiment, one or more of these factors are monitored and/or controlled.

The material which makes contact with the liquid in the reservoir 107 can comprise a variety of materials as discussed above. In one embodiment, the reservoir 107, the pump 108 housing, and the connecting lines comprise polypropylene or other material which is impervious to the acidic conditions of the liquid.

The reservoir 107 is coupled to a pump 108. The size of the reservoir can vary depending on relative space as well as fuel requirements. In one embodiment the reservoir ranges from about 3 quarts to about 50 gallons. The pump 108 can comprise any type of pump known in the art. In one embodiment the pump 108 comprises a 12 or 24 Volt DC pump. In one embodiment the pump 108 comprises housing and an impeller made from polypropylene which is impervious to acid. In one such embodiment, the pump 108 comprises a magnet which connects the impeller to the motor so that the motor will not be subject to the liquid within the pump housing. In one embodiment, no electrical parts of the pump 108 come into contact with the liquid in the pump housing. The pump 108, as depicted, is located upstream of the chamber 101, and downstream of the reservoir 107. The flow rates of the pump 108 can vary depending on the application. The flow rates can range from 0.5 gallons per minute to about 6 gallons per minute. In one embodiment the flow rates range from about 1.3 gallons per minute to about 3.5 gallons per minute.

In one embodiment the system 100 further comprises a cooler 109. Electrolysis produces heat, and that heat must be removed to prevent overheating the system 100. Overheating the system 100 increases part degradation. The cooler 109 can be located upstream or downstream of the pump 108. The cooler 109 can comprise virtually any type of cooler including but not limited to a radiator fin cooler, a single or double pass heat exchanger, a chiller, etc. The cooler 109 moderates and maintains a desired temperature. In one embodiment the temperature of the liquid ranges from between about 80° to about 200° F. or greater. In one embodiment the temperature of the liquid ranges from between about 95° to about 120° F.

Fluid is pumped into the chamber 101 via a chamber inlet 106. The chamber inlet 106 can couple with the chamber 101 at any point. In one embodiment the chamber inlet 106 couples to the bottom of the chamber 101 whereas in other embodiments the chamber inlet 106 couples to the side of the chamber 101. The chamber 101, discussed in detail below, is the location wherein the electrolysis occurs. In one embodiment the chamber 101 is filled with liquid. In one embodiment the chamber 101 is completely filled with liquid such that all parts are submerged.

The chamber 101 is connected to a power source 102. The power source 102 can comprise virtually any power source including a battery or even AC power. The power source 102 is coupled to the chamber 101 via a cathode electrode 103 and an anode electrode 104.

Downstream of the chamber 101 is the chamber outlet 105. The chamber outlet 105 couples the chamber 101 to the reservoir 107. As depicted, in one embodiment the system flows clockwise from the reservoir 107 to the pump 108, to the cooler 109, to the chamber 101, and back to the reservoir 107. For ease of reference an object clockwise of an object will be referred to as downstream. Thus, as depicted, the pump 108 is downstream of the reservoir 107. Conversely, as depicted, the pump 108 is upstream of the chamber 101.

As noted, during electrolysis in the chamber 101, a mixture of gas is produced. The gas and liquid mixture exits the chamber 101 through the chamber outlet 105. The chamber outlet 105 can couple to the reservoir 107 at virtually any location including the bottom, top, and side.

Once within the reservoir 107, the gas and liquid separate and the gas raises to the top of the reservoir 107 through the gas outlet 133. In one embodiment there is no pressure in the reservoir 107. In other embodiments, however, the reservoir 107 can withstand pressures as high as 30 psi. As noted, in one embodiment the gas outlet 133 is connected to an engine 110. In other embodiments the gas outlet 133 is coupled to a storage container wherein the hydrogen based fuel is stored.

In one embodiment the system 100 further comprises a filter (not shown). Degradation of materials, solids in the water, electrolytes, etc. result in fine solid particles which are present in the fluid. In one embodiment, if these solids are not removed, they can plug the plates resulting in decreased efficiency. A filter helps remove these fine particles. In one embodiment the filter comprises a 2 micron or less filter. In another embodiment, the filter comprises a 0.5 micron polypropylene filter. Such a filter is impervious to the often acidic conditions and thus does not degrade. The filter traps these small impurities so they can be removed from the system.

Figure 2A:
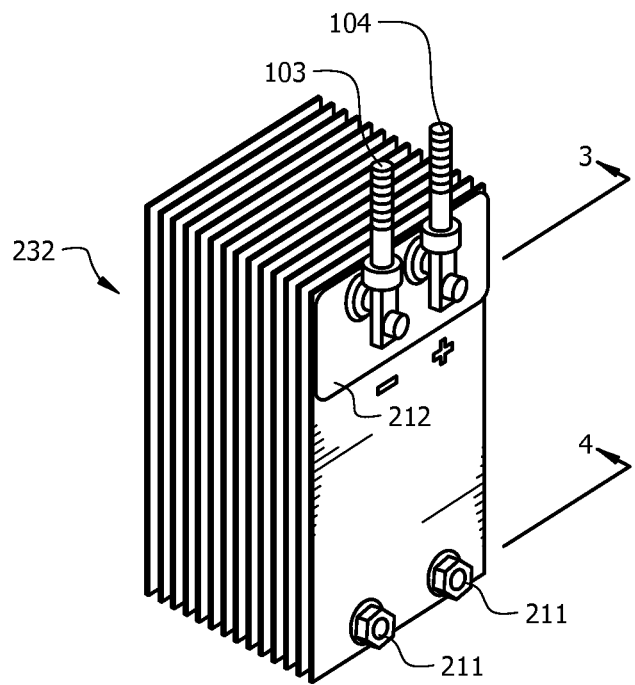
FIG. 2A is a perspective view of a two cell electrolytic unit in one embodiment.
Figure 2B:
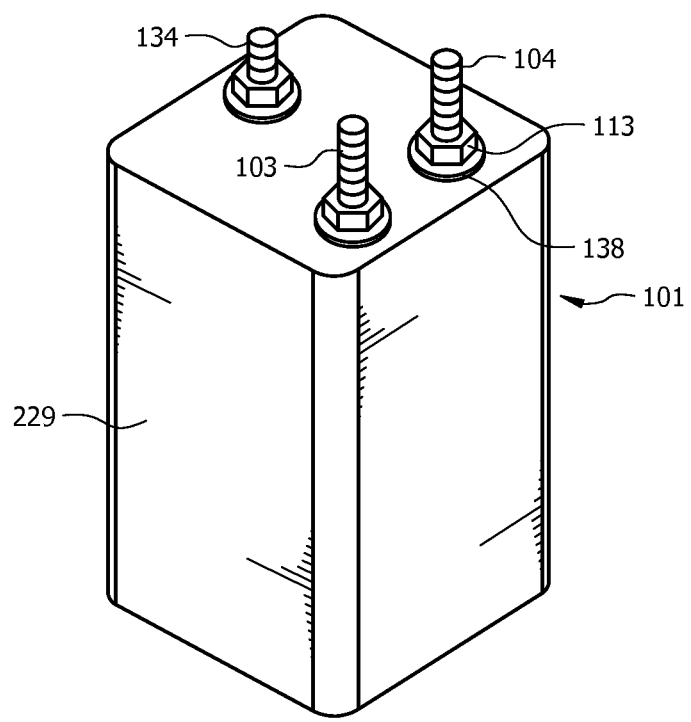
FIG. 2B is a perspective view of a chamber in one embodiment.

FIG. 2A is a perspective view of a two-cell electrolytic unit in one embodiment. FIG. 2B is a perspective view of a chamber in one embodiment. The electrolytic unit 232 of FIG. 2A fits within the chamber cover 229. As can be seen from both FIG. 2A and FIG. 2B, the electrolytic unit 232 comprises a cathode electrode 103 and an anode electrode 104. Virtually any type of electrode can be utilized. In one embodiment the cathode electrode 103 comprises titanium steel and the anode electrode 104 comprises stainless steel. As noted above, the types of materials utilized during electrolysis dictate, in part, which hydrogen-based fuel is produced. Titanium results in ortho-hydrogen, a very powerful fuel, being produced. Further, titanium is not susceptible to the acidic properties of the electrolyte and does not become sacrificial. Other materials which can be utilized include, but are not limited to, gold, platinum, nickel, and silver.

As seen in FIG. 2B, the electrodes stick up out of the chamber cover 229. This allows the power source to couple to the chamber 101. The chamber cover 229 can comprise any non-conductive material. As used herein, a non-conductive material is a material that resists the flow of electric charge, also called a dielectric, as is well known to one skilled in the art. Non-conductive materials include plastics such as ABS plastics, nylon, polypropylene etc. Virtually any material which can withstand temperatures of 200° F. and which are impervious to acid can be utilized as the non-conductive material. Also seen is the outlet adapter 134. The outlet adapter 134 couples with the chamber outlet 105. In one embodiment the outlet adapter 134 is non-conductive.

FIG. 2B also illustrates a non-conductive washer 113 which sits between the top of the chamber cover 229 and the electrodes.

As depicted, the electrodes are on the right side of the chamber 101. For reference purposes, the side closest to the electrodes will be referred to as the front side. The side opposite of the front side is referred to as the back side.

Turning back to FIG. 2A, the figure illustrates the electrode buffer plate 212. This buffer plate 212 serves as a buffer between the electrodes and the first plate 214. The buffer plate 212 is non-conductive, and in one embodiment comprises a thickness of about ⅛ of an inch and two holes each with a diameter of about ⅜ of an inch through which one cathode screw and one anode screw will be inserted.

As depicted the electrolytic unit 232 comprises 14 plates and two cells. This will be discussed in more detail below and should not be deemed limiting.

Figure 3:
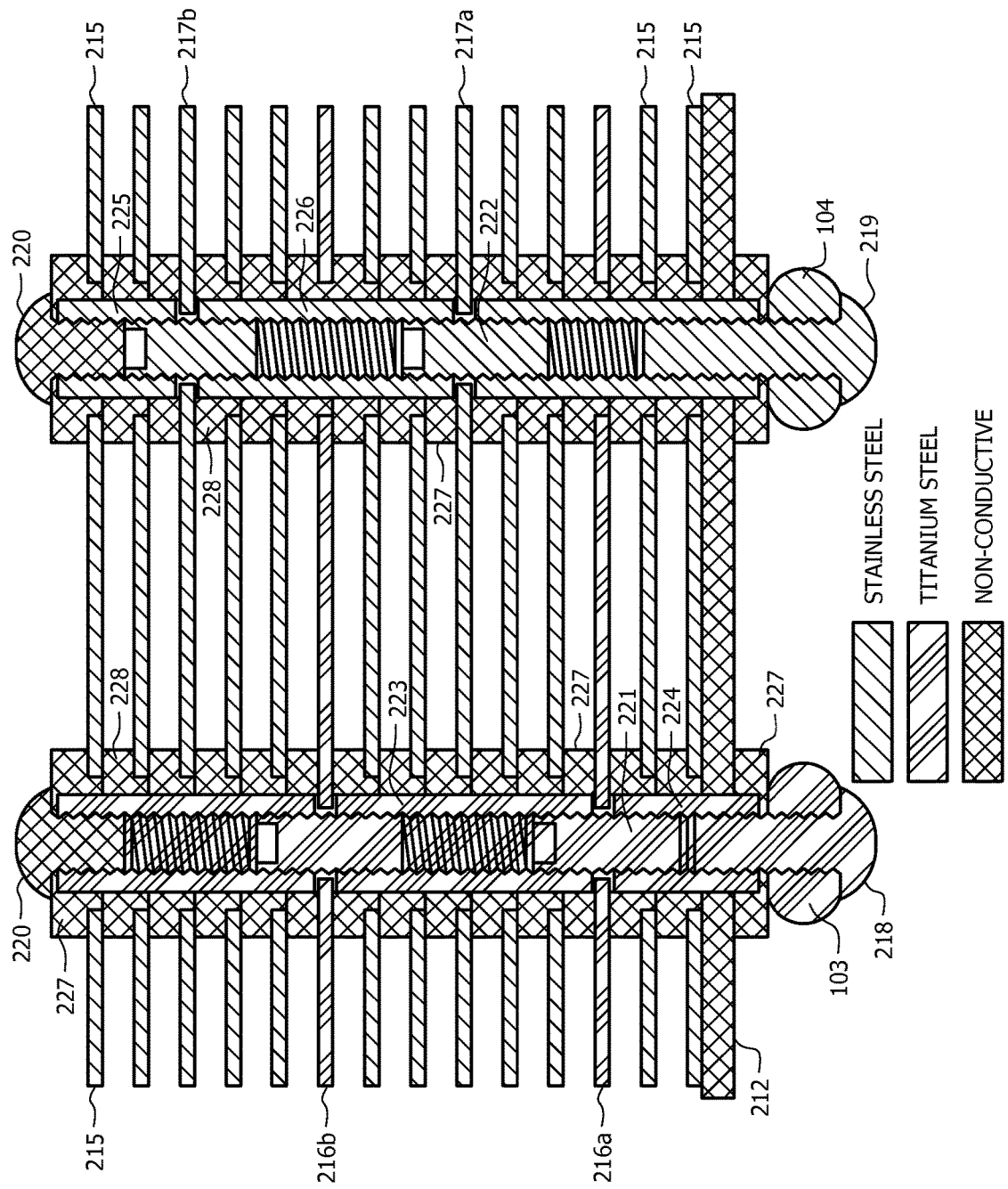
FIG. 3 is a cross-sectional view of the electrolytic unit in FIG. 2A.

FIG. 3 is a cross-sectional view of the electrolytic unit in FIG. 2A. As can be seen in FIG. 3, there are 14 plates. As depicted, there are ten neutral plates 215. The neutral plates 215 can comprise virtually any conductive material including but not limited to stainless steel, 304, 316, 440 and other grades of stainless steel. Stainless steel, and the various grades, have a benefit of not degrading in the electrolyte solution. In one embodiment the neutral plates 215 are not connected to any conductive piece. The neutral plates 215 serve to control the rate of electrolysis, control the amperage within the system 100, minimize temperature, and minimize degradation.

In one embodiment, and as depicted, the first plate is a neutral plate 215. The first plate 215 is the plate which is closest in proximity to the cathode 218 and anode 219 screws. Thus, the first plate is the plate closest to the front side. The plates are numbered numerically beginning at the plates closest to the location of the electrodes, the front side. In one embodiment, and as depicted, the first two plates are neutral plates 215. When the first plate, or first two plates, are neutral plates 215, this allows a buffer between the first conductive plate, either titanium or stainless steel as depicted, and the cathode screw 218 and anode screw 219. The neutral plates 215 creates a buffer so that the electrolysis is isolated and occurs only where it is designed and desired to occur, namely, between two conductive plates. Minimizing or eliminating unwanted electrolysis, or any electrolysis which does not occur between two conductive plates, maximizes the efficiency of the desired electrolysis and reduces erosion of materials. If the first plate were not neutral, then even with the electrode buffer plate 212, undesirable electrolysis occurs between conductive plates and parts such as the cathode screw 218, for example, causing wear on the cathode screw 218. Thus, in one embodiment one or more neutral plates 215 are adjacent to the front side. As noted, this improves electrolysis efficiency while minimizing part degradation.

Figure 5:
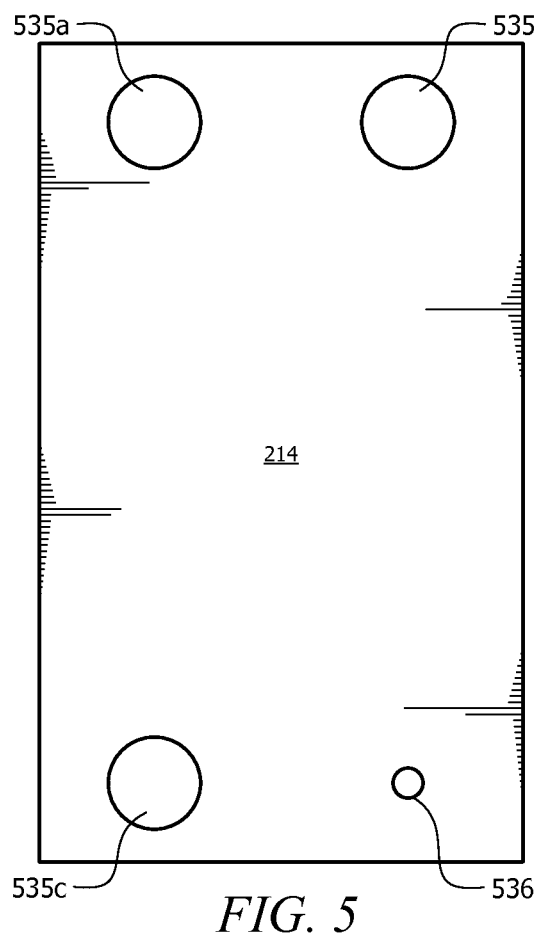
FIG. 5 is a top view of a plate with a neutral orientation.

Turning briefly to FIG. 5, FIG. 5 is a top view of a plate in a neutral orientation in one embodiment. As can be seen the plate 214 comprises four holes 535*a-c*, 536 which are adjacent to the corners of the plate. In one embodiment the plate is six inches long, 3.5 inches wide, and between about 0.01-0.06 inches thick. In another embodiment the plate is between about 0.028 and 0.032 inches thick. The thickness and other dimensions are provided for illustrative purposes only and should not be deemed limiting. Additionally, while the shape is provided as rectangular other shapes can be utilized.

As depicted the plate comprises three large holes 535*a-c* of the same diameter and one small hole 536 of a smaller different diameter. In one embodiment the large holes 535*a-c* comprise a diameter of about ⅝ of an inch. In one embodiment the small hole 536 comprises a diameter of about ¼ inch. While specific diameters are discussed, it should be understood that this is for illustrative purposes as other diameters can be successfully utilized. Further, as will be discussed, in one embodiment the anode insert 222 and cathode insert 221 which passes perpendicular through the plates comprise a diameter of about ¼ inch, and this is why, in the embodiment discussed, the small hole 536 has a diameter of ¼ inch. If the diameter of the anode insert 222 and cathode insert 221 changes, so too would the diameter of the small hole 536.

As depicted, the plate is oriented such that there are two large holes 535*a, b* located at the top of the plate. If the plate is installed vertically into the electrolytic unit 232 of FIG. 2A so that the two large holes 535*a,b* are at the top, the plate will function as a neutral plate. Thus, the orientation depicted in FIG. 5 is referred to as the neutral orientation. The reason for this is that, in the embodiment discussed, the anode insert 222 and cathode insert 221 which pass through the top of the plates are ¼ inch in diameter and the large holes 535*a,b* comprise a diameter of ⅝ of an inch. As such, the ¼ inch diameter anode insert 222 or cathode insert 221 cannot make contact with the plate because the large holes 535*a,b* are too large. Thus, the plate is a neutral plate.

Figure 6:
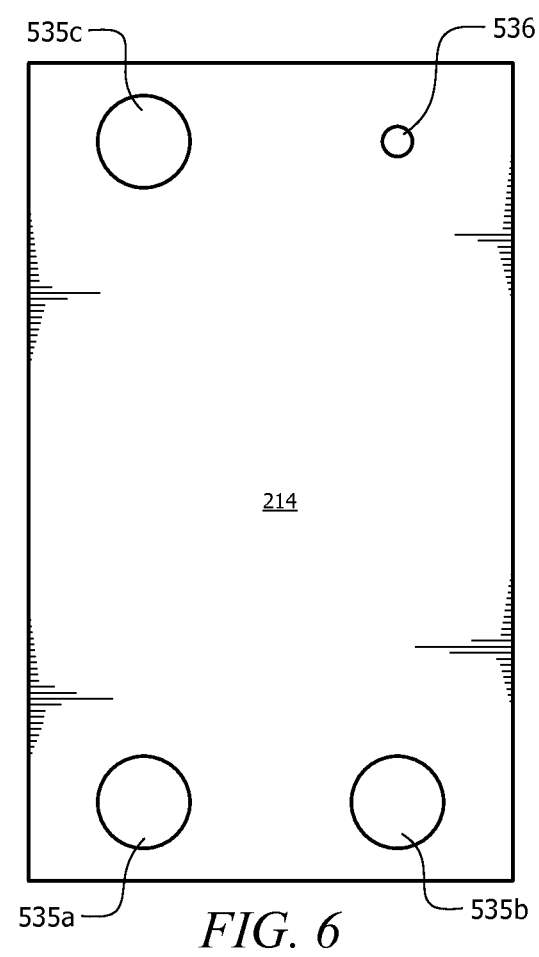
FIG. 6 is a top view of a plate with an anode orientation.

Turning to FIG. 6, FIG. 6 is a top view of a plate with an anode orientation in one embodiment. If the plate of FIG. 5 is flipped around a horizontal axis such that the top becomes the bottom, the orientation depicted in FIG. 6 results. The anode orientation is an embodiment wherein the small hole 536 is located at the top and is on the right side of the plate. The two large holes 535*a,b* are located on the bottom of the plate. If the plate is installed into the electrolytic unit 232 in FIG. 2A, the plate will make contact with the anode insert 222 and/or the anode spacers 226, 225. The small hole 536 has a diameter, in one embodiment of about ¼ of an inch. Because the anode insert 222 has a diameter of ¼ inch, the anode insert 222 and or the anode spacers 225, 226 are sufficiently close to the ¼ inch small hole 536 to make electrical contact with the plate. Electrical contact, as used herein, is sufficient contact to allow electricity to be conducted through the contacting surfaces. In one embodiment, electrical contact is sufficient contact to avoid any shorts. In one embodiment, the spacers are solidly cinched tightly by the insert to provide electrical contact. Thus, in one embodiment the insert is tightened to allow the spacers to pinch down upon the plate. This electrical contact makes this plate an anode plate. The remaining large holes 535*a-c* are too large to make contact with the cathode insert 221 or anything else. The only conductive material which makes contact with the anode plate is the anode insert 222 and/or the anode spacers 226, 225, discussed below.

It can be seen that the same plate can be used for both the neutral and the anode plates. Thus, in one embodiment the same material which acts as a neutral plate also acts as an anode plate. In one embodiment, the neutral plate and the anode plate comprise stainless steel. In one embodiment, aside from the orientation, the neutral plate and the anode plate are indistinguishable. This is a significant advantage during manufacturing as it reduces costs. Because the same plate can be used as a neutral plate and an anode plate, a smaller number of custom parts must be designed and built. Further, having uniform parts has several other benefits including ease and consistency of manufacturing. When manufacturing the electrolytic unit 232 the plates simply need to be oriented in the desired position prior to installation.

Figure 7:
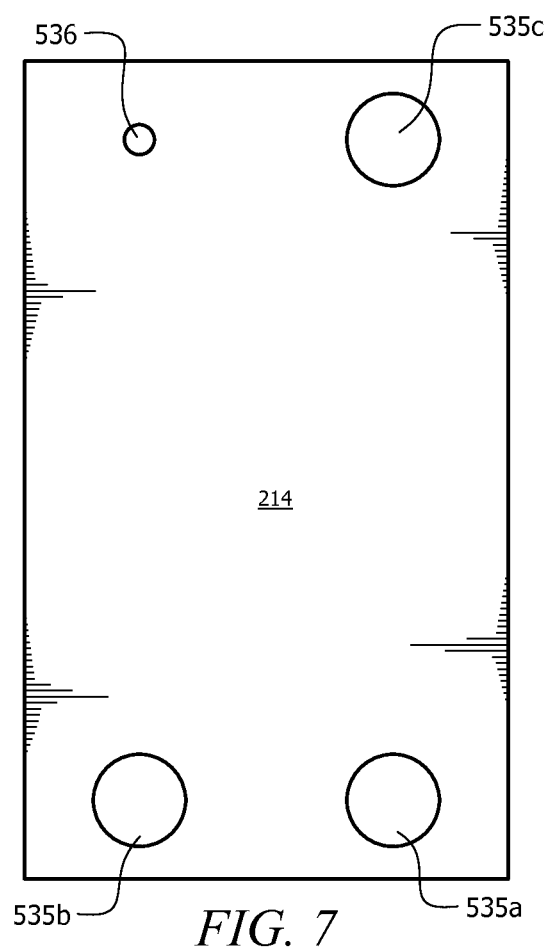
FIG. 7 is a top view of a plate with a cathode orientation.

Turning to FIG. 7, FIG. 7 is a top view of a plate with a cathode orientation in one embodiment. As depicted, the cathode orientation has two large holes 535*a,b* at the bottom and a small hole 536 located at the top left. This is the cathode orientation because, in the embodiment depicted, the cathode is on the left. If, however, the cathode was on the right side of the electrolysis unit 232, then the cathode orientation would depict the small hole 636 being located on the right side. If the plate is installed into the electrolytic unit 232 in FIG. 2A, the plate will make contact with the cathode insert 221 and or the cathode spacers 224, 223. The small hole 536 has a diameter, in one embodiment of about ¼ of an inch. Because the cathode insert 221 has a diameter of ¼ inch, the cathode insert 221 and or the cathode spacers 224, 223 are sufficiently close to the ¼ inch small hole 536 to make electrical contact with the plate. This makes this plate a cathode plate. The remaining large holes 535*a-c* are too large to make contact with the anode insert 221 or anything else. The only conductive material which makes electrical contact with the cathode plate is the cathode insert 221 and/or the cathode spacers 224, 223. As noted above, in one embodiment the cathode plate comprises titanium steel.

In one embodiment all plates, including neutral, cathode, and anode plates, have approximately the same dimensions. This provides uniformity and efficiency to the electrolytic unit 232. Further, such uniformity simplifies the manufacturing process.

Turning back to FIG. 3, the cathode 103 and anode 104 electrodes are depicted. The cathode 103 and anode 104 electrodes are coupled respectively via a cathode screw 218 and an anode screw 219. In one embodiment, the same material is used in both the plates and the screws. For example, in one embodiment the cathode screw 218 comprises titanium steel whereas the anode screw 219 comprises stainless steel. This is not limiting as any conductive material can be utilized. In one embodiment the cathode 218 and anode 219 screws have a diameter of about $1/4$ inch.

It can be seen that the cathode screw 218 is shorter than the anode screw 219. Thus, in one embodiment the cathode screw 218 and the anode screw 219 have different lengths. The reason for this is that this ensures the cathode side is offset from the anode side. This will be discussed in more detail below.

Adjacent to the cathode 218 and anode 219 screws is a non-conductive flat washer 227. In one embodiment the same type of non-conductive flat washer 227 is used for both the cathode side and the anode side. The non-conductive flat washer 227 provides an additional buffer for the electrodes.

In one embodiment the non-conductive flat washer 227 has hole with a diameter of about $3/8$ of an inch. Thus, as depicted, the non-conductive flat washer 227 fits around the cathode short spacer 224 which is coupled to the cathode screw 218. In one embodiment the cathode short spacer 224 is the same material as the cathode screw 218. In one embodiment the cathode short spacer 224 has internal threads and an outer diameter of $3/8$ of an inch.

Coupled to the cathode short spacer 224 is a cathode insert 221. The cathode insert 221, in one embodiment, comprises the same material as the cathode screw 218. In one embodiment the cathode insert 221 comprises external threads and a diameter of about $1/4$ of an inch. In one embodiment the cathode insert 221 comprises an Allen screw. An Allen screw can be tightened to shorten the distance between the cathode short spacer 224 and a cathode long spacer 223, which is similar to the cathode short spacer 224 just longer. By closing the gap between the cathode short 224 and long 223 spacers, the cathode insert 221 causes the spacers to pinch and make electrical contact with the cathode plate 216a. This contact makes the cathode plate 216a conductive to allow for electrolysis.

Because the depicted electrolysis unit 232 is a two cell unit, the cathode long spacer 223 is coupled to an additional cathode insert 221, which couples to an additional cathode long spacer 223. The second cathode insert 221 causes the second cathode plate 216b to make electrical contact with either the cathode insert 221, the cathode long spacers 223, or combinations thereof. This causes the second cathode plate 216b to become conductive.

The anode side works in a similar fashion with the anode inserts 222, the anode long spacer 226, and the anode short spacer 225. The short and long anode spacers are arranged to ensure that they meet at a conductive plate. Thus, the anode short 225 and the anode long 226 spacers meet at the anode plates 217a,b.

Starting again at the first neutral plate 215, as noted because of the large holes 535a,b, the neutral plate does not make contact with either the cathode or anode spacers, inserts, or screws. Referring to the cathode side, the first neutral plate 215 makes contact with a non-conducting stepped washer 228. The non-conducting stepped washer 228 can comprise any non-conductive material. In one embodiment the stepped washer 228 comprises a hole with a diameter of $3/8$ of an inch so that it can fit around the spacers. In one embodiment the stepped washer comprises two dissimilar outer diameters: a first outer diameter on top and a second outer diameter at a lower portion. In one embodiment the second outer diameter is smaller than the first outer diameter. In one embodiment the second outer diameter is about $5/8$ of an inch whereas the first outer diameter is greater than $5/8$ of an inch. These dimensions allow the washer to both sit above the neutral plate 215 and sit adjacent to the first neutral plate 215 between the first neutral plate 215 and a spacer. In this fashion, the stepped washer 228 acts as an insulating barrier preventing the neutral plate from making contact with the screw, insert, or spacer. The stepped washer 228 operates in the same fashion on the anode side. In one embodiment, above each neutral plate is a stepped washer 228. The stepped washer 228 also has an advantage of increasing stability of the plates. For example, refer to the stepped washer 228 above the first neutral plate on the cathode side. The top portion of the stepped washer 228, the portion with the larger outer diameter, fits around the cathode short spacer 224. The second lower portion, due to the shorter outer diameter, fits within the hole in the neutral plate. Thus, the stepped washer 228 fills the void that would otherwise exist in the space between the neutral plate and the non-conducting rod 230 at the location of the large hole 535a,b,c. Filling the voids prevents the neutral plate from having the space to move. As such, the stepped washer 228 increases the stability of the plates. Increasing the stability of the plates helps maintain the desired spacing between plates.

The various washers dictate the separation between plates. Thus, in one embodiment the stepped washer 228 comprises a thickness of about $1/8$ of an inch. Such a thickness results in a separation between plates of about $1/8$ of an inch. As noted, uniformity increases efficiency of electrolysis and efficiency of manufacturing. In other embodiments the separation between plates ranges from about $1/16$ of an inch to $1/4$ of an inch. A spacing of about $1/8$ of an inch controls the amperage draw at each junction. If the spacing it too low, the plates use too much power to make the optimal amount of gas and the effectiveness of the dampening neutral plates is decreased. If the spacing is too great, the plates fail to utilize the energy correctly and production of gas decreases.

As can be seen, the second neutral plate also has a stepped washer 228 preventing the neutral plate from making contact with any other conducting material. The third plate, however, is the first cathode plate 216a. As previously noted, the cathode plate 216a makes electrical contact with the cathode spacers 223, 224 and/or the cathode insert 221. Because of the cathode orientation, the small hole 536 is located on the cathode side such that electrical contact is made. As contact is encouraged in this scenario to make the cathode plate 216a conductive, a stepped washer 228 is not utilized as a stepped washer 228 would not fit within the small hole 536. Put differently, there is no gap like the gap at the location of the large hole 535a-c as discussed above. Because there is not a gap, a stepped washer 228 is not utilized. Instead, a flat washer 227 is utilized above the first cathode plate 216a. As noted, in one embodiment the flat washer 227 comprises a thickness of about $1/8$ of an inch resulting in a separation of about $1/8$ of an inch between the third plate, the first cathode plate 216a, and the fourth plate, a neutral plate.

The fourth and fifth plates, as depicted, are neutral plates. Thus, in one embodiment, a cathode plate 216a,b and an anode plate 217a,b are separated by two neutral plates. As previously noted, the number of neutral plates has several effects on the electrolysis. The number and spacing of the neutral plates can be adjusted to control these factors. In one embodiment, the every neutral plate, with a ⅛ of an inch spacing, results in a drop of between about 2-2.5 Amps. Thus, while additional neutral plates can be utilized, in one embodiment, this results in decreased gas production.

The fourth and fifth plates are assembled as previously discussed with each being topped by a stepped washer 228. The sixth plate is the first anode plate 217 a. Due to its orientation, the small hole 536 is positioned so that it is located where the two anode long spacers 226 meet. Above the first anode plate 217a is a flat washer 227.

The remainder of the electrolytic unit 232 is assembled as discussed. At the back side of the electrolytic unit 232, the spacers are capped with a non-conducting screw 220 which screws into the spacer. The non-conducting screw 220 is coupled to a non-conducting stepped washer 228. If a conducting screw were utilized as a cap, undesirable electrolysis could occur. The non-conducting screw 220 helps prevent unwanted electrolysis.

As previously noted, there are several features, including non-conducting screws 220 and electrode buffer plate 212, which serve to ensure that unwanted electrolysis is minimized or eliminated. In one embodiment the desirable electrolysis occurs only between cathode and anode plates. Thus, in FIG. 3, the electrolysis is confined between the third plate, the first cathode plate 216a, and the twelfth plate, the second anode plate 217b. The electrolysis occurs between the first cathode plate 216a and the first anode plate 217a. It also occurs between the first anode plate 217a and the second cathode plate 216b. Finally, it also occurs between the second cathode plate 216b and the second anode plate 217b. In one embodiment, all other electrolysis is minimized or eliminated. In one embodiment greater than 95% of all electrolysis occurs in the desired location.

Figure 4:
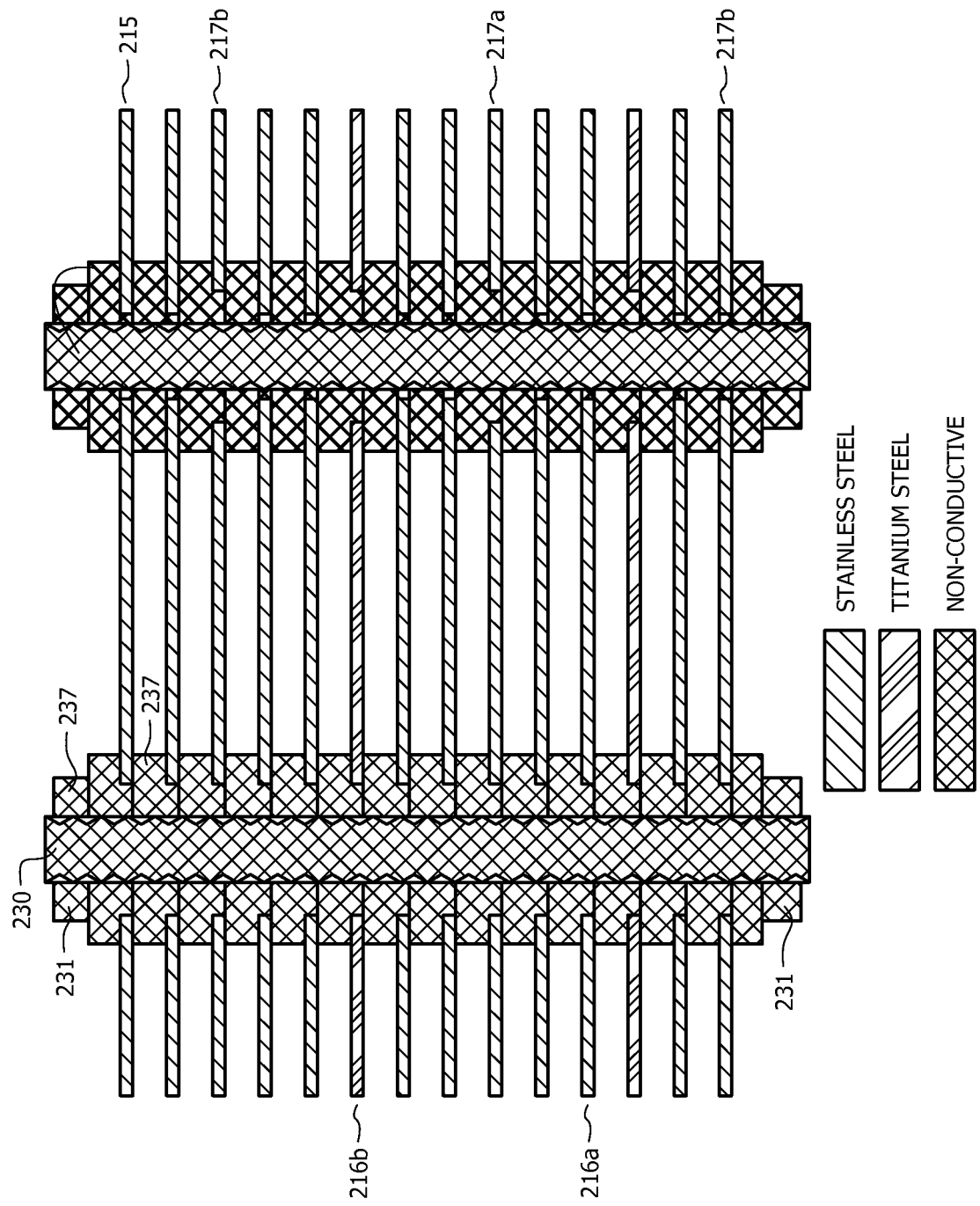
FIG. 4 is a cross-sectional view of the electrolytic unit in FIG. 2A.

FIG. 4 is a cross-sectional view of the electrolytic unit in FIG. 2A. Perpendicular to the plates is the non-conducting rod 230. In one embodiment the non-conducting rod comprises a diameter of about ¼ of an inch. The non-conducting rod 230, as depicted, is at the bottom of the plate whereas the cathodes and anodes are at the top of the plate. The non-conducting rod 230 serves to support the plates and maintain the desired separation. The non-conducting rod 230 is optional, and in some embodiments is not utilized. While FIG. 4 depicts two non-conducting rods 230 this is not limiting. In some embodiments a single non-conductive rod 230 is utilized, or as noted above, in some embodiments no non-conductive rods 230 are utilized.

The front end of the non-conducting rod 230 is secured to the outside of the first plate by a non-conducting nut 231 and a non-conducting flat washer 239. In an embodiment wherein the non-conducting rod 230 comprises a diameter of ¼ of an inch, a non-conducting flat washer 239 with an opening of ¼ of an inch is utilized.

The back end of the non-conducting rod 230 is secured to the outside of the final neutral plate by a non-conducting nut 231 and a non-conducting stepped washer 237. The non-conducting stepped washer 237 acts similar to the non-conducting stepped washer 228 previously discussed. In one embodiment, the non-conducting stepped washer 237 used for the non-conducting rod 230 comprises a hole of about ¼ of an inch so as to fit around the non-conducting rod 230. As previously discussed the stepped washer 237 increases the stability of the plates and helps maintain uniform separation. While stepped washers 237 have been discussed, in other embodiments flat washers can also be utilized.

Turning back to the front end, and specifically to the first neutral plate, it can be seen that a stepped washer 237 is utilized above the neutral plate on the cathode side. However, on the anode side on the first neutral plate, a flat non-stepped washer 239 is utilized. This is because this is the location of the small hole 536 in the neutral plate orientation. Thus, as depicted, each neutral plate on the anode side will comprise a flat non-stepped washer 239. The flat non-stepped washer 239 is similar to the flat washer 227 previously discussed. In one embodiment the flat non-stepped washer 239 comprises a hole of about ¼ of an inch so as to fit around the non-conducting rod 230.

Each plate is added as discussed above and a washer, either stepped or flat, is inserted between to ensure a desired separation between plates. It can be noted that as depicted, each cathode plate and each anode plate has a large hole 235a,b at the location of the non-conducting rod 230. This is a result of the cathode and anode orientation which ensure the small hole 236 aligns with either the anode insert 222 or cathode insert 221.

While FIGS. 2-4 show a two cell, fourteen plate embodiment, this is for illustrative purposes and should not be deemed limiting. In other embodiments a single cell electrolytic unit 232 is utilized. In one such embodiment the single cell unit comprises 8 plates: one anode plate, one cathode plate, and six neutral plates. In one embodiment the first two plates are neutral, followed by a cathode plate, followed by two neutral plates, followed by an anode plate, and finally capped with two neutral plates.

In one embodiment a five cell unit is utilized. In one such embodiment, the five cell unit comprises 30 total plates. This includes five cathode plates, five anode plates, and twenty neutral plates. The number of cells and plates is limited only by the size in which the unit can be utilized as well as the power which can be delivered to the unit.

As noted above, a spacing of about ⅛ of an inch with two neutral plates between conducting plates, in one embodiment, provides efficient gas production. If the quantity of neutral plates is increased, the amp draw and cell temperature decreases, and accordingly, so does the gas production. With two neutral plates, the temperature is increased, compared to two, but the increased temperature can be decreased with a cooler as discussed above.

The amount of hydrogen based fuel produced by the system is dependent upon several factors including number of cells, number of plates, materials of the plates, power supplied to the system, etc. In one embodiment utilizing a 12 V car battery, the system produces between about 5-6 L of gas per minute. In one embodiment, a majority of the gas produced comprises ortho-hydrogen.

Figure 8:
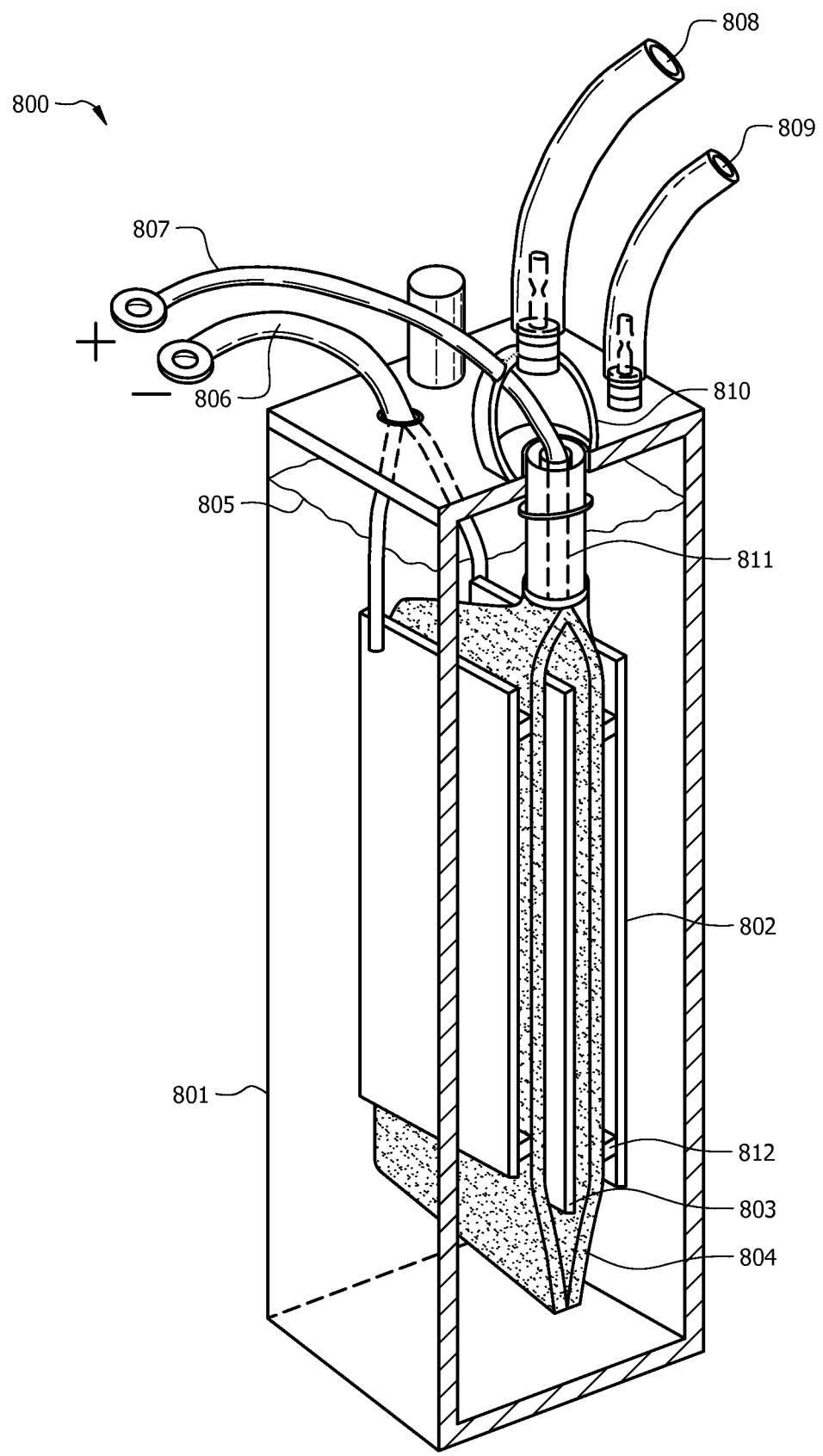
FIG. 8 is a perspective view of a pocket cell system in one embodiment.

Another embodiment of the pocket cell system will now be described. An embodiment of the disclosed pocket cell system is described in FIG. 8. In FIG. 8, pocket cell system 800 includes a cell housing 801 that serves to provide a housing for the various components of the present pocket cell system. Cell housing 801 may be constructed of any suitable non-conductive material. Cell housing 801 can comprise any non-conductive material. As used herein, a non-conductive material is a material that resists the flow of electric charge, also called a dielectric, as is well known to one skilled in the art. Non-conductive materials include plastics such as ABS plastics, nylon, polypropylene etc. Virtually any material which can withstand temperatures of 200° F. and which are impervious to acid can be utilized as the non-conductive material. As shown in FIG. 8, cell housing 801 is of a rectangular cube structure for illustrative purposes, and no particular shape of cell housing is required.

Continuing with FIG. 8, pocket cell system 800 comprises at least two plates, including at least one cathode 802 and at least one anode 803. As depicted in FIG. 8, the pocket cell system comprises two cathodes 802. In one embodiment, each cathode 802 is constructed of titanium, but various materials are suitable as discussed above. Titanium is not susceptible to the acidic properties of the electrolyte and does not become sacrificial.

In one embodiment, the anode 803 is made of stainless steel, but other suitable materials can be employed as discussed above. The types of materials utilized during electrolysis dictate, in part, which hydrogen-based fuel is produced. While one embodiment using lead and titanium has been discussed, this is for illustrative purposes only and should not be deemed limiting. Other materials which can be utilized include, but are not limited to, gold, platinum, nickel, and silver.

As seen in FIG. 8, anode 803 and cathodes 802 are vertically situated within cell housing 801 and are parallel in relation to each other. In one embodiment, anode 803 is situated in envelope 804. Anode 803 and cathodes 802 are in the form of plates. Within cell housing 801, the anode 803, cathode 802, and envelope 804 are immersed in electrolyte solution 805 which comprises water and electrolytes. In one embodiment the water comprises distilled water. An electrolyte is a substance containing free ions which are the carriers of electric current. Pure distilled water is not electrically conductive, and thus impurities or other solids are needed to make water electrically conductive. Electrolytes within the water make water electrically conductive.

Virtually any type of electrolyte can be utilized. Possible electrolytes include, but are not limited to, the electrolytes discussed above, potassium hydroxide, sodium hydroxide, acids, bases, and salts. During hydrolysis, the bond between the oxygen and hydrogen in the water molecule is broken with electrical energy, releasing hydrogen gas, oxygen gas, hydrogen based fuels, and combinations thereof. Thus, the amount of water in the system decreases over time as the water is converted into a gas. However, the electrolytes, provided there are no leaks in the system, do not otherwise leave the system. Accordingly, electrolytes, once added to the reservoir, do not require frequent replacement. In one embodiment, the fluid comprising electrolytes is acidic.

The concentration of the electrolytes within the fluid can vary. In one embodiment, the amount of electrolytes is related to the amps being drawn by the electrolytic cell from the power source. The electrolyte concentration, the pH, and the temperature of the fluid all have an effect on electrolysis. Consequently, in one embodiment, one or more of these factors are monitored and/or controlled.

Power is supplied to pocket cell system 800 through cathode lead 806 and anode lead 807. The power source 802 can comprise virtually any power source including a battery or even AC power. In one embodiment, one anode lead 807 is associated with a positive terminal of a power supply and one end cathode lead 106 is associated with the negative terminal of the power supply. The power source 802 is electrically coupled to pocket cell 800 via a cathode lead 806 and an anode lead 807. As used herein, electrically coupled refers to a coupling such that an electric current can flow.

A second end of anode lead 807 is coupled to anode plate 803. A second end of cathode lead 806 is coupled to each cathode plate 802. In one embodiment, anode and cathode leads are copper cable. In one embodiment, multiple cathode leads 806 are bundled at the exterior of cell housing 801 with material such as a shrink tube or other suitable non-conductive conduit material. Through anode lead 807 and cathode lead 806, power is supplied to the cathodes 802 and anode 803.

As seen in FIG. 8, the electrodes extend from a side of cell housing 801. This allows the power source to couple to the cell housing 801.

Cathodes 802 are maintained at a desired distance away from envelope 804 and the associated anode 803 by one or more spacers 812. In one embodiment the spacers are non-conductive. In one embodiment the cathodes 802 and anode envelope 804 are separated by a distance. In one embodiment the anodes 803 and the anode envelope 804 are separated by a distance. In one embodiment the cathode 802 and anode 803 are separated by a distance of approximately 1 and ⅛ to about 1 and ¼ of an inch.

As used herein, an "envelope" refers to a material which maintains the gases produced by the cathode and anode separated. In one embodiment, the anode envelope 804 comprises a material through which the electrolyte solution 805 can flow, but which is impervious to the gases produced by the cathode and anode.

In one embodiment, the envelope 804 encompasses at least one plate. The plate can comprise either the cathode 802 or the anode 803. As depicted in FIG. 8, the envelope 804 encompasses the anode 803. This is for illustrative purposes only and should not be deemed limiting. In other embodiments, the envelope 804 encompasses the cathode 802. As used herein, encompass means to at least partially surround. In one embodiment, encompass comprises fully surrounding at least one plate.

As used herein, a free plate refers to a plate which is not encompassed by an envelope. As depicted, the cathodes 802 in FIG. 1 are both free plates because they are not encompassed by the envelope. Conversely, the anode 803 is an encompassed plate because it is encompassed within the envelope 804.

Referring back to FIG. 8, coupled to and external to an upper section of cell housing 801 is aerator housing 810. Coupled to an upper portion of envelope 804 is outlet hose 811. Oxygen gas produced by anode 803 escapes cell housing 801 through pocket gas valve 811 and enters aerator housing 810. Aerator housing 810 collects whichever gas is produced by the enveloped plate.

Coupled to the aerator housing 810 is an envelope gas outlet line 808. The envelope gas outlet line 808 in one embodiment is formed of a flexible hose materials. The envelope gas outlet line 808 is coupled to the aerator housing 810, in one embodiment, by a threaded end that is received in a threaded corresponding appropriately sized opening in aerator housing 810. As depicted, the anode lead 807 also penetrates the aerator housing 810 to electrically couple the power source to the anode 803. Thus, as depicted, the pocket gas valve 811 also serves as a conduit for anode lead 807. The junction point of the anode lead 807 and the aerator housing 810 is sealed to prevent escape of gas produced by the enveloped anode 803.

A secondary gas outlet line 809 is coupled to the cell housing 801. Secondary gas outlet line 809 permits the escape and subsequent collection of gas produced by the non-enveloped plate.

The cathodes 802 produce hydrogen and the anodes 803 produce oxygen. Thus, in the depicted configuration of FIG. 8, the oxygen produced is collected through the aerator housing 810. The hydrogen gas is collected and removed through the secondary gas outlet line 809. In other embodiments, however, the cathode 802 is encompassed by the envelope. In such embodiments, hydrogen gas would be collected through the aerator housing 810, and oxygen gas would be collected through the secondary gas outlet line 809.

As depicted, the secondary gas outlet line 809 is secured to cell housing 801 with a threaded hose barb that is received by a corresponding threaded interior opening formed in cell housing 801.

On the upper side of cell housing 801 is a filler hole for filling cell housing 801 with electrolyte solution 805.

Figure 9:
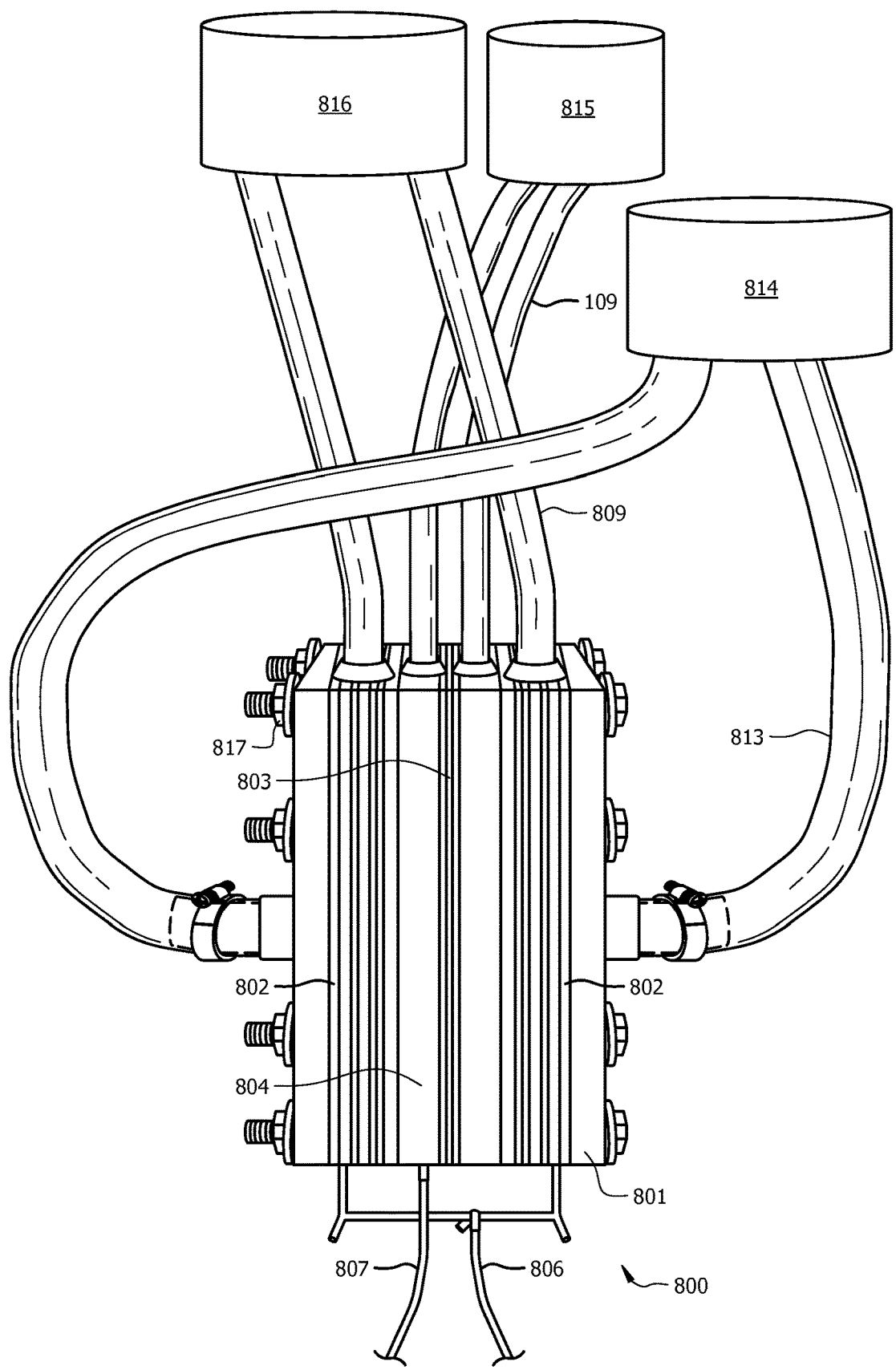
FIG. 9 is a perspective view of a pocket cell system in one embodiment.

FIG. 9 depicts the pocket cell system 800 with associated hydrogen and oxygen collection receptacles and associated assemblies. As seen in FIG. 9, pocket cell system comprises cathodes 802 and anode 803 which are situated within cell housing 801. In the depicted embodiment, the envelope 804 encompasses anode 803. The cathode lead 806 and anode lead 807 extend from the cell housing 801 and are available for connection to a power supply (not shown). Laterally disposed on opposite sides of the cell housing 801 are electrolyte inlets 813. Electrolyte inlets 813 introduce electrolyte solution 805 to cell housing 801. Electrolyte storage 814 is coupled to electrolyte inlets 813 and serves as a source for the electrolyte solution.

Envelope gas outlet line 808, which carries gas produced by the plate encompassed by envelope 804 is shown coupled at distal end to oxygen collector 815. As used herein, an oxygen collector 815 is any device which is used to collect or transport oxygen. The oxygen collector 815 can comprise a pipe, a tank, etc. In one embodiment, the oxygen collector 816 is coupled to an engine.

Secondary gas outlet line 809, which carries gas produced by the plates outside of envelope 804 is shown coupled at a distal end to hydrogen collector 816. As used herein, a hydrogen collector is any device which is used to collect or transport hydrogen. The hydrogen collector 816 can comprise a pipe, a tank, etc. In one embodiment, the hydrogen collector 816 is coupled to an engine.

Clamping device 817, comprising nuts and bolts as depicted in FIG. 9, penetrates the various layers of pocket cell system 800 and maintain electrolyte solution 805 within cell housing 801. Any suitable device for clamping or securing the described anode and cathode arrangement within cell housing 801 while providing continued immersion of the arrangement in the electrolyte solution will suffice. In one embodiment, an external clamp is used to provide the necessary force to maintain the pocket cell system 800 in its desired orientation.

In one embodiment, oxygen produced by the pocket cell system 800 is produced at about 70° F. The temperature of the hydrogen produced is higher at about 110° F. Electrolysis is exothermic, meaning, heat must be removed from the system or it accumulates within the system. Previous electrolysis units required a separate cooler, cooler fan, cooler pump, etc., which adds overhead to the system in terms of size and cost. In one embodiment, the relatively cool oxygen produced by the present pocket cell system is used to cool the electrolyte solution and/or the hydrogen gas. This reduces or eliminates the need for a separate cooler and all accompanying equipment, reducing both the capital cost and footprint required for the system. Virtually any type of heat exchanger can be used.

Recall that in the embodiment depicted in FIG. 8, the anode 803 is encompassed by envelope 804 causing oxygen gas to be produced and isolated therein. Thus, the collector associated with envelope gas outlet line 808 of this embodiment of the present pocket cell system is an oxygen collector. As noted, should a cathode 802 be encompassed by envelope 804, then the collector associated with the envelope gas outlet line 808 would be a hydrogen collector.

In one embodiment the system 800 further comprises a filter (not shown). Degradation of materials, solids in the water, electrolytes, etc. result in fine solid particles which are present in the fluid. In one embodiment, if these solids are not removed, they can plug the plates resulting in decreased efficiency. A filter helps remove these fine particles. In one embodiment the filter comprises a 2 micron or less filter. In another embodiment, the filter comprises a 0.5 micron polypropylene filter. Such a filter is impervious to the often acidic conditions and thus does not degrade. The filter traps these small impurities so they can be removed from the system.

In one embodiment, cathode 802 and anode 803 plates are six inches long, 3.5 inches wide, and between about 0.01-0.06 inches thick. In another embodiment the plate is between about 0.028 and 0.032 inches thick. The thickness and other dimensions are provided for illustrative purposes only and should not be deemed limiting. Additionally, while the shape is provided as rectangular other shapes can be utilized.

While FIGS. 8 and 9 depict a single cell, three plate embodiment, this is for illustrative purposes and should not be deemed limiting.

The amount of hydrogen based fuel produced by the system is dependent upon several factors including number of cells, number of plates, materials of the plates, power supplied to the system, etc. In one embodiment utilizing a 12 V car battery, the system produces between about 1 to about 50 L of gas per minute.

While a system for producing hydrogen and oxygen has been discussed, a method of making hydrogen and oxygen gas will now be discussed. First, a current is applied to a pocket cell system 100. The current can originate from any power source discussed herein.

The pocket cell system 700 comprises at least one plate encompassed by an envelope and at least one free plate which is adjacent to the envelope 804. At least one of the plates comprise a cathode 802 and at least one of the plates comprise an anode 803. The cell housing comprises an electrolytic solution 805.

Because of the supplied current, a first gas is produced by at least one plate encompassed by an envelope 804. Simultaneously, a second gas is produced by at least one free plate. The first and second gases are collected before the first and second gases are allowed to mix. The envelope 804 acts as a barrier to maintain the first and second gasses separated.

As discussed, the arrangement of the plates, and determining which plates, either the cathode 802 or the anode 803 are the free plates, controls the quantity and type of gas produced. Thus, the arrangement of the plates can be altered depending on the desired gas.

The system and method disclosed herein have several applications. First, as noted, the system can produce hydrogen gas. The hydrogen gas can be used for any purpose, including as a fuel. Thus, in one embodiment, the hydrogen gas is fed to an engine as either the primary or supplemental fuel. In one such embodiment, the oxygen can either be fed to the engine or the cab. As an example, in one embodiment the hydrogen is fed to the engine whereas the oxygen gas is fed to the inside of the truck, cabin, etc. for use by the human operators. In another embodiment, the system is used to supply oxygen to a human. The system can be used in scuba diving, on a submarine, in space, etc.

The production of hydrogen gas is an advantage. Hydrogen gas is much more stable than ortho-hydrogen. Accordingly, hydrogen gas is a safer fuel. Further, hydrogen gas burns more effectively and completely compared to other gasses. As such, the fuel efficiency is increased compared to other fuels.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

1. A system for electrolysis, said system comprising an electrolytic unit, wherein said electrolytic unit comprises:
   a front end and a back end;
   a cathode electrode coupled a cathode screw at said front end;
   an anode electrode coupled to an anode screw at said front end;
   a first cathode spacer coupled to said cathode screw;
   a first anode spacer coupled to said anode screw;
   a first cathode insert coupled to said first cathode spacer, said first cathode insert further coupled to a second cathode spacer;
   a first anode insert coupled to said first anode spacer, said first anode insert further coupled to a second anode spacer;
   a first cathode plate comprising at least two holes, wherein said at least two holes comprise at least one large hole and at least one small hole, wherein one of said large holes aligns with but does not make electrical contact with said first anode spacer, wherein said large hole comprises a diameter greater than the diameter of said first anode spacer, wherein said at least one small hole aligns with said first cathode insert so as to make electrical contact with said first cathode insert;
   a first anode plate comprising at least two holes, wherein said at least two holes comprise at least one large hole and at least one small hole, wherein one of said large holes aligns with but does not make electrical contact with said first cathode spacer, wherein said large hole comprises a diameter greater than the diameter of said first cathode spacer, wherein said at least one small hole aligns with said first anode insert so as to make electrical contact with said first anode insert.

2. The system according to clause 1 wherein said electrolytic unit comprises a neutral plate, wherein said neutral plate is approximately perpendicular to said cathode screw and said anode screw, wherein said neutral plate is approximately parallel with said first anode plate and said first cathode plate, wherein said neutral plate comprises at least two holes, wherein said first cathode spacer and said first anode spacer are located within said at least two holes.

3. The system according to clause 2 wherein said electrolytic unit comprises two neutral plates in front of said first anode plate.

4. The system according to clause 2 wherein said electrolytic unit comprises two neutral plates between said first anode plate and said first cathode plate.

5. The system according to clause 2 wherein said electrolytic unit comprises first and second neutral plates at the front end, wherein said two neutral plates are followed by said first cathode plate, wherein said first cathode plate is followed by a third and fourth neutral plates, and wherein said third and fourth neutral plates are followed by said first anode plate.

6. The system according to clause 5 wherein said first and second neutral plates are separated by a stepped washer, wherein said stepped washer comprises a thickness of about ⅛ of an inch.

7. The system according to clause 5 wherein each plate is separated by at least one stepped washer and at least one flat washer, wherein said flat washer is located at said small hole.

8. The system according to clause 2 wherein said electrolytic unit comprises two neutral plates at the front end, wherein said two neutral plates are followed by said first anode plate, wherein said first anode plate is followed by two additional neutral plates, and wherein said two additional neutral plates are followed by said first cathode plate.

9. The system according to any preceding clause wherein said cathode plate comprises titanium steel.

10. The system according to any preceding clause wherein said anode plate comprises stainless steel.

11. The system according to clause 2 wherein said plates are separated by about ⅛ of an inch.

12. The system according to clause 2 wherein said electrolytic unit further comprises a top end and a bottom end, and a left non-conducting rod and a right non-conducting rod, wherein said cathode screw and said anode screw are located at a top end, and wherein said left non-conducting rod and a right non-conducting rod are located at said bottom end.

13. The system according to clause 12 wherein each plate comprises four holes, three large holes and one small hole.

14. The system according to clause 12 wherein said first cathode plate comprises four holes, three large holes and one small hole, wherein one of said large holes aligns with said left non-conducting rod, wherein one of said large holes aligns with said right non-conducting rod, wherein one of said large holes aligns with but does not make electrical contact with said first anode spacer.

15. The system according to any preceding clause wherein said electrolytic unit is upstream of a reservoir, wherein said electrolytic unit is downstream of a cooler, and wherein said electrolytic unit is downstream of a pump, and wherein said electrolytic unit is electrically coupled to a power source.

16. The system according to clause 15 further comprising a filter upstream of said electrolytic unit.

17. The system according to clause 16 wherein said filter comprises a 0.5 micron polypropylene filter.

18. The system according to clause 15 wherein gas is removed from said reservoir.

19. The system according to clause 18 wherein said gas comprises ortho-hydrogen gas.

20. The system according to clause 18 wherein 5-6 L/minute of gas is removed from said reservoir.

21 A system for making hydrogen and oxygen, said system comprising:
   a pocket cell comprising at least two plates enclosed within a housing, wherein at least one of said at least two plates comprises a cathode, and wherein at least one of said at least two plates comprises an anode;
   an electrolytic solution within said cell housing;
   electrical leads electrically coupled to the at least one cathode and the at least one anode;
   an envelope which encompasses at least of one of said at least two plates.

22. The system of any proceeding or preceding claim comprising at least two cathodes and one anode, and wherein said envelope encompasses said anode.

23. The system of any proceeding or preceding claim comprising at least two anodes and one cathode, and wherein said envelope encompasses said cathode.

24. The system of any proceeding or preceding claim further comprising an electrolyte storage unit coupled to said pocket cell via an electrolyte inlet line, a hydrogen collector coupled to said pocket cell via a hydrogen line, and an oxygen collector coupled to said pocket cell via an oxygen line.

25. The system of any proceeding or preceding claim wherein said oxygen line is used to cool said pocket cell.

26. A method for making hydrogen and oxygen gas, said method comprising:
   a. applying a current to a pocket cell, wherein the pocket said comprises at least one plate encompassed by an envelope and at least one free plate adjacent to said envelope, wherein one of said plates comprises a cathode and one of said plates comprises an anode, and wherein said cell housing comprises an electrolytic solution;
   b. collecting a first gas produced by said at least one plate encompassed by an envelope;
   c. collecting a second gas produced by said at least one free plate;
   wherein steps b and c occur before mixing of said first and second gasses.

27. The method any proceeding or preceding claim wherein said encompassed plate comprises an anode.

28. The method any proceeding or preceding claim wherein said encompassed plate comprises a cathode.

29. The method of any proceeding or preceding claim further comprising:
   d. using said first gas to cool said pocket cell.

What is claimed is:

1. A system for making hydrogen and oxygen, said system comprising:
   a pocket cell comprising at least two plates enclosed within a housing, wherein at least one of said at least two plates comprises a cathode, and wherein at least one of said at least two plates comprises an anode;
   an electrolytic solution within said cell housing;
   electrical leads electrically coupled to the at least one cathode and the at least one anode;
   an envelope which encompasses at least of one of said at least two plates; wherein at least one of said cathodes and one of said anodes are separated by a distance of approximately 1 and ⅛ to about 1 and ¼ of an inch.

2. The system of claim 1 comprising at least two cathodes and one anode, and wherein said envelope encompasses said anode.

3. The system of claim 1 comprising at least two anodes and one cathode, and wherein said envelope encompasses said cathode.

4. The system of claim 1 further comprising an electrolyte storage unit coupled to said pocket cell via an electrolyte inlet line, a hydrogen collector coupled to said pocket cell via a hydrogen line, and an oxygen collector coupled to said pocket cell via an oxygen line.

5. The system of claim 4 wherein said oxygen line couples to a heat exchanger is used to cool said pocket cell.

6. A method for making hydrogen and oxygen gas, said method comprising:
   a. applying a current to a pocket cell, wherein the pocket comprises at least one plate encompassed by an envelope and at least one free plate adjacent to said envelope, wherein one of said plates comprises a cathode and one of said plates comprises an anode, and wherein said cell housing comprises an electrolytic solution; wherein at least one of said cathodes and one of said anodes are separated by a distance of approximately 1 and ⅛ to about 1 and ¼ of an inch;
   b. collecting a first gas produced by said at least one plate encompassed by an envelope;
   c. collecting a second gas produced by said at least one free plate;
   wherein steps b and c occur before mixing of said first and second gasses.

7. The method of claim 6 wherein said encompassed plate comprises an anode.

8. The method of claim 6 wherein said encompassed plate comprises a cathode.

9. The method of claim 6 further comprising:
   d. using said first gas in a heat exchanger to cool said electrolytic solution in said pocket cell.

* * * * *